United States Patent [19]

Zeigler et al.

[11] Patent Number: 4,891,139

[45] Date of Patent: Jan. 2, 1990

[54] METHOD FOR WET OXIDATION TREATMENT

[76] Inventors: Joseph E. Zeigler, 9915 Raleigh, Westminster, Colo. 80030; Hermann W. Peterscheck, 2201 Fourteenth Ave., Apt. 4-300, Longmont, Colo. 80501

[21] Appl. No.: 300,009

[22] Filed: Jan. 17, 1989

Related U.S. Application Data

[62] Division of Ser. No. 95,987, Sep. 14, 1987, Pat. No. 4,822,394.

[51] Int. Cl.⁴ ............................................... C02A 1/74
[52] U.S. Cl. .................................... 210/747; 62/50.2; 210/761; 210/766
[58] Field of Search .................. 62/17, 9, 52, 53, 50.2; 210/761, 766, 747

[56] References Cited

U.S. PATENT DOCUMENTS

| | | | |
|---|---|---|---|
| 4,272,383 | 6/1981 | McGrew | 210/741 |
| 4,704,146 | 11/1987 | Markbrieter et al. | 62/17 |
| 4,822,394 | 4/1989 | Ziegler et al. | 62/17 |

*Primary Examiner*—Peter Hruskoci
*Assistant Examiner*—Krisanne Shideler
*Attorney, Agent, or Firm*—Dykema Gossett

[57] ABSTRACT

The present invention provides a method and apparatus for collecting and liquefying off-gases, particularly carbon dioxide, generated by a wet oxidation of organic matter and for the on sight gasification of liquid oxygen for use as an oxidant in the wet oxidation reaction. Through a series of separation and pressurization operations, high pressure off-gases are introduced into a heat exchanger at substantially the same time as liquid oxygen. The liquid oxygen and compressed off-gases are in heat exchange relation in the heat exchanger but are isolated from one another. Heat is transferred from the compressed off-gases to the liquid oxygen whereby the off-gases are liquified and the liquid oxygen is gasified. The liquified off-gases may then be stored in appropriate storage units. The gaseous oxygen is used as the oxidant for the wet oxidation reaction.

In another aspect, odor-producing compounds are removed from the off-gases by a condensation process wherein the odor-producing compounds are separated from the off-gases by condensation. In still another aspect, these odor-producing compounds are removed from the off-gases after liquifaction by a chemical operation which chemically strips the odor-producing compounds from the liquified off-gases.

4 Claims, 3 Drawing Sheets

METHOD FOR WET OXIDATION TREATMENT

This application is a divisional application of our U.S. application Ser. No. 095,987, filed Sept. 14, 1987, now U.S. Pat. No. 4,822,394.

FIELD OF THE INVENTION

The present invention relates generally to the utilization of off-gases produced by wet oxidation reactions. More specifically, the present invention deals with methods and apparatus for converting off-gases into a form suitable for use in other processes.

BACKGROUND OF THE INVENTION

The cost effectiveness of many large-scale chemical reactions is often determined by the marketability of the varius reaction products. At the very least, the efficient utilization of reaction products produced during industrial reactions is highly desirable. Similarly, the effective and judicial use of energy and its conservation within a system produces significant economic and environmental advantages. Hence, methods and apparatus for achieving favorable product utilization and energy conservation are of great importance in the design and operation of large-scale reactions.

One reaction which has been shown by the assignee of the present invention to be economically viable is the large-scale wet oxidation of organic waste products such as municipal waste. Originally, wet oxidation reaction apparatus typically included massive, thick-walled, high pressure, above ground reactors with complex mechanical stirring mechanisms. As an alternative to these above ground reactors, attempts were made to design low-profile, subterranean or "down-hole" reaction apparatus. As a result, the first known successful subterranean wet oxidation reaction apparatus was constructed and operated by the assignee of the present application according to the principles set forth in McGrew U.S. Pat. No. 4,272,383 which is assigned to the assignee of the present invention and the disclosure of which is incorporated herein by reference. This down-hole reaction apparatus has a vertical configuration which utilizes gravitational force and thermodynamic relationships to provide a high-pressure reaction environment in which thermal energy is conserved.

The down-hole reaction apparatus is particularly useful in breaking down organic matter present in municipal waste through aqueous-phase combustion, generally referred to as wet oxidation. As will be known to those skilled in the art, wet oxidation of combustible matter is an exothermic reaction which proceeds quite rapidly at temperatures above 350° F. The reduction of chemical oxygen demand (COD) of the waste is the primary goal of municipal waste destruction, and by reducing the COD of the waste, eutrophication of receiving waters is prevented. In addition, the wet oxidation process degrades potentially toxic hydrocarbons which would otherwise serve as a source of pollutants. Thus, wet oxidation is a proven method for the destruction of municipal waste and industrial organic waste.

Generally, a down-hole reaction apparatus comprises a vertically oriented, large subsurface chamber defined by the casing of a subterranean shaft. The subterranean shaft extends about 3,000 to 10,000 feet and preferably about 5,000 feet into the earth. Suspended in the chamber and spaced apart from the casing is a tubular reaction vessel. The tubular reaction vessel has a closed-end waste containment tube in which a waste pipe is centrally disposed. The containment tube and waste pipe are arranged concentrically to form an external passage or annulus defined by the inner wall of the containment tube and the outer wall of the waste pipe. The bore of the waste pipe and the external passage are in flow communication at the lower end of the reaction vessel. Also suspended in the chamber is a conduit which is substantially parallel to, but spaced apart from, the reaction vessel. Through this conduit, a heat transfer medium is preferably flowed into the chamber. Thus, an externalized heat exchanger is provided.

In order to rapidly oxidize large quantities of organic matter found in municipal waste, it is necessary to supply an oxidant. Hence, in operation, municipal or industrial waste containing organic matter is flowed into the downgoing reaction passage along with an oxidant, typically air and preferably oxygen enriched air or gaseous oxygen. Generally, liquid oxygen is supplied on site which must then be converted into the gaseous state. The rate of flow of the diluted municipal waste and the gaseous oxidants through the reaction apparatus are regulated to provide a mixed flow velocity which promotes intense mixing. Mixing enhances the mass transfer between the oxygen and the combustible components of the municipal waste. The gaseous oxygen is preferably injected into the diluted municipal waste through one or more gas supply lines which are suspended in the downgoing and/or upcoming reactant passage. Hence, it will be appreciated by those skilled in the art that the injection of gaseous oxygen or an oxygen enriched gas into the diluted municipal waste is an important aspect of the down hole wet oxidation process.

As the concentration of available oxygen and the temperature of the waste increase, the rate of the wet oxidation reaction increases. The exothermic oxidation generates substantial heat which, in turn, further elevates the temperature of the reactants. When the temperature of the reactants exceeds about 350° F. to about 400° F., the reaction becomes autogenic. The hydrostatic head of the column of diluted waste prevents the reaction mixture in the downcomer from boiling. Typically, the column of diluted waste mixed with gaseous oxygen will extend the entire length of the mile long reaction apparatus. The temperature of the reaction mixture is allowed to increase to about 500° F. to 700° F. in a reaction zone in the lower part of the downgoing reactant passage. The diluted municipal waste is thus oxidized in the wet oxidation reaction. The reaction products, or effluent, include a low-volume, sterile ash, a liquid effluent and off-gases. Supercritical reaction conditions are also possible.

These off-gases in the wet oxidation of municipal sludge, for example, include carbon dioxide, carbon monoxide, and short chain hydrocarbon gases along with relatively smaller concentrations of other constituents. Nitrogen and hydrogen are also produced during supercritical operation. When the wet oxidation process is operated to obtain very high COD reductions, the off-gases may contain an excess of 90% by volume $CO_2$. The off-gases generated by the wet oxidation reaction may also have an obtrusive odor. It would therefore be desirable to devise a convenient method by which compounds producing these undesirable odors can be efficiently eliminated.

As a chemical commodity, carbon dioxide is one of the highest volume chemicals produced in the United States, $CO_2$ is used widely in greenhouses to promote photosynthesis. $CO_2$ is used in various industrial chemical processes, including coke gasification processes. Liquid oxygen and liquid nitrogen are used as coolants in many applications such as the cooling of superconductors. As will be appreciated by those skilled in the art, to be a marketable commodity, these gases must be in the liquid state for ease of handling and shipment. It will also be appreciated that the liquefaction of gases generally requires a considerable expenditure of energy and is thus quite costly using conventional methods. Although the wet oxidation of municipal waste is an excellent source of gaseous $CO_2$, the $CO_2$ off-gas is generally not marketable unless it is liquified. Therefore it would be desirable to devise an economical method for liquefying the off-gas, and in particular the $CO_2$ generated during wet oxidation.

The present invention provides such a method and apparatus for liquefying wet oxidation off-gases which at the same time gasifies liquid oxygen for injection into the wet oxidation reaction mixture. In another aspect, the present invention provides a method and apparatus for removing odor-producing compounds from the off-gases.

SUMMARY OF THE INVENTION

In accordance with the present invention, there is provided a method and apparatus for producing and liquefying various gases, particularly carbon dioxide, and for gasifying liquid oxygen. First, an effluent is generated preferably by wet oxidation reaction, and the off-gases are separated from the effluent. The gases may be separated as one or more fractions, such as a $CO_2$ fraction, a nitrogen fraction or the like, which are flowed independently into a compressor, or alternatively, the off-gas mixture is flowed directly into the compressor. The gases are then compressed so that the gas pressure and temperature are increased considerably. The high temperature, pressurized off-gases are then cooled to near ambient temperature and any water vapor contained in the off-gases is condensed and removed. The cooled off-gases are then flowed into a heat exchanger. At substantially the same time, liquid oxygen is flowed into the heat exchanger apart from, but in heat transfer relation with, the off-gases. Through the cooling action of the liquid oxygen in the heat exchanger, the off-gases are liquified. The heat transferred from the off-gases to the liquid oxygen gasifies the liquid oxygen. The liquified off-gases may then be flowed to a separator where non-condensed off-gases are removed. In those instances where the off-gas mixture has not previously been separated into its constituent gases or fractions, separation in the liquid state may be carried out. The liquified off gases are then conveniently stored or transported to another location. The now gaseous oxygen is then flowed out of the heat exchanger and injected into the wet oxiation apparatus to serve as the oxidant in the wet oxidation reaction. The flow of the gases and liquids is preferably continuous.

In another aspect of the present invention, odorous substances, such as short chain hydrocarbon gases contained within the wet oxidation reaction off-gases, are removed prior to the liquefaction of the off-gases through a treatment or after liquefaction through a stripping process.

DESCRIPTION OF THE PREFERRED EMBODIMENTS

Figure 1:
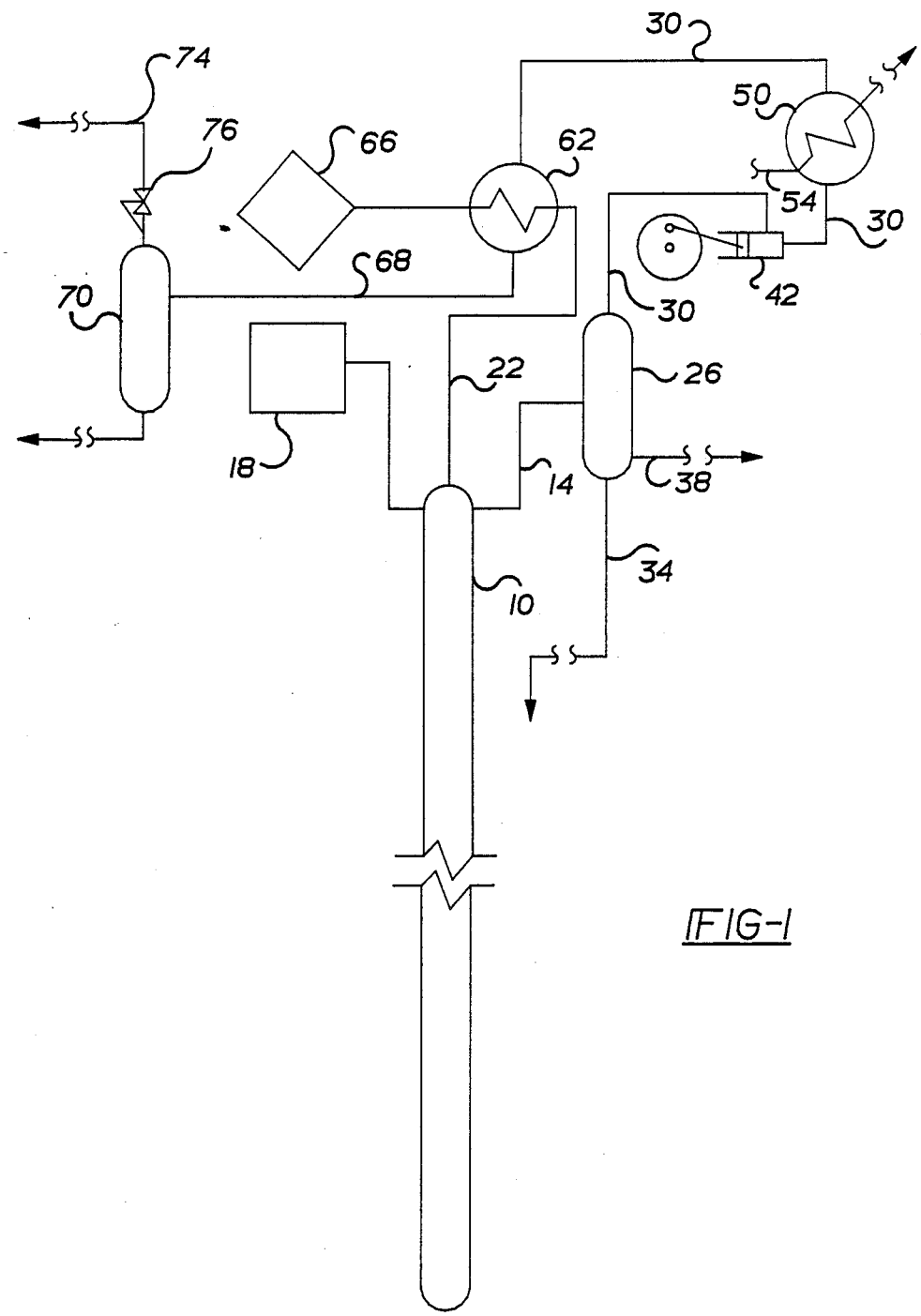
FIG. 1 schematically illustrates the method and apparatus of the present invention.

Referring now to FIG. 1 of the drawings, a wet oxidation reaction is carried out in reaction apparatus 10 to produce an effluent waste steam 14. The preferred wet oxidation reaction is the wet oxidation of municipal waste or industrial waste, preferably an aqueous dilution, using gaseous oxygen as an oxidant although other reactants may be suitable in some applications. The preferred reaction apparatus 10 is a subterranean or "down-hole" reaction apparatus of the type which has been successfully operated by the assignee of the present invention and the construction of which is based on the principles set forth in the aforementioed U.S. Patent to McGrew, the disclosure of which is incorporated by reference. Thus, reaction apparatus 10 preferably includes a vertical assembly of pipes or tubes which are suspended in a cased well. The pipes extend approximately 5,000 ft. below ground level and are arranged to define a series of annuli. In a typical application, the pipe assembly has a central bore which serves as the downgoing passage of a heat exchanger. The first or innermost annulus is closed at its lower end in flow communication with the downgoing passage of the heat exchanger. This annulus functions as the upcoming passage of the central heat exchanger. As described above, heat-transfer medium such as oil may be circulated through the heat exchanger by pumping it into the downgoing passage and then flowing it back through the upcoming passage. The tubes which define the downgoing passage and upcoming passage or annulus of the heat exchanger are positioned in the bore of a somewhat larger pipe or tube such that a second annulus is defined. The second annulus is the downgoing or influent passage for the reactants.

Another preferred subterranean wet oxidation reaction apparatus for use in the present invention is that disclosed in U.S. patent application Ser. No. 025,470 assigned to the assignee of the present invention, the disclosure of which is incorporated herein be reference. This alternate down-hole reaction apparatus includes a large, vertically oriented, subsurface chamber defined by the casing of a subterranean shaft or well which extends, again 3,000 to 10,000 and generally 5,000 ft. into the earth. Suspended in this chamber and spaced apart from the casing is a tubular reaction vessel having a closed-end waste containment tube in which a waste pipe is centrally disposed. The containment tube and waste pipe are concentrically arranged to form an external passage or annulus defined by the inner wall of the containment tube and the outer wall of the waste pipe. The bore or internal passage of the waste pipe and the external passage are in flow communication at the lower end of the reaction vessel in the fashion of an hydraulic U-tube. Also suspended in the chamber is a conduit which is substantially parallel to, but spaced apart from, the reaction vessel. Through this conduit, a heat transfer medium is preferably flowed into the chamber. Thus, an externalized heat exchanger is provided.

In both arrangements of reaction apparatus 10, gas supply lines extend downwardly into the reaction vessel passages. Gaseous oxygen is flowed through these gas supply lines into the waste passages. That is, the gaseous oxygen oxidant for the wet oxidation reaction of the present invention is supplied to the organic waste through these gas supply lines.

Still other suitable configurations of reaction apparatus 10 useful in the present invention are disclosed in U.S. patent application Ser. No. 847,965 and U.S. patent application Ser. No. 004,453 both of which are assigned to the assignee of the present invention and the disclosures of which are incorporated herein by reference. These two reaction apparatus are typically operated above ground and include reaction coils through which a waste reactant is flowed along with gaseous oxygen to produce a wet oxidation reaction which, as stated, generates effluent waste 14.

The wet oxidation reaction which takes place in reaction apparatus 10 is an exothermic reaction which proceeds quite readily at temperatures above 350° F. In operation, a reaction mixture shown as diluted municipal waste or influent waste 18, having a preselected chemical oxygen demand is pumped into reaction apparatus 10. The COD of diluted municipal waste 18 is preferably from about 1.0 percent to about 6.0 percent COD and the diluent is water. Gaseous oxygen 22 is added to influent waste 18. Gaseous oxygen 22, which serves as the oxidant for the wet oxidation reaction is shown in FIG. 1 being flowed directly into reaction apparatus 10. It is to be understood that it may be possible in some embodiments of the present invention to add gaseous oxygen 22 to influent waste 18 before influent waste 18 is flowed into reaction apparatus 10. Also, although the preferred wet oxidation reaction and reaction apparatus 10 are continuous in nature, batch reactions and reactors may possibly be used herein if the principles of the present invention are faithfully observed. It is also suitable in some applications to inject the gaseous oxygen into the upcomer.

The reaction mixture to which gaseous oxygen is supplied is heated to at least about 350° F. As the wet oxidation reaction proceeds more vigorously, additional heat is generated which is absorbed by the reaction mixture. The temperature of the reaction mixture is allowed to rise in this manner to between about 420° F.–700° F., preferably about 500° F. to 550° F. The reaction mixture is under pressure which prevents boiling. As an alternative, supercritcial reaction parametes may be preferred. As will be understood, supercritical reaction temperatures are substantially greater than described, and supercritical reaction pressures may be achieved by increasing the length or depth of the nested pipe reaction apparatus. Effluent waste 14 produced by the wet oxidation reaction contains the reaction products which are a low-volume, sterile ash, a liquid effluent and effluent off-gases or simply "off-gases." As described above, the off-gases typically include $CO_2$, $CO$, $O_2$ and hydrocarbons. $H_2$ and $N_2$ are also produced during supercritical reactions. Effluent waste 14 is then flowed into separator 26 where the off-gases 30 are removed. It will be appreciated by those skilled in the art that off-gases 30 primarily contain carbon dioxide along with short chain hydrocarbon gases. The amount of carbon dioxide in off-gases 30 is principally a function of the degree of COD reduction carried out in the wet oxidation reaction. A COD reduction of 80% or more in most off-gases 30 will generally contain in excess of 90% by volume $CO_2$. It is also preferred that the liquid portion 34 of effluent waste 14 be separated from sterile ash 38 in separator 26. Liquid portion 34 is primarily water although some dissolved and suspended compounds may be contained therein. Sterile ash 38, which remains after the separation of liquid portion 34, and off-gases 30 may then be further processed for various uses or removed to landfill.

Separator 26 is pressurized from about 300 psig to vacuum and off-gases are flowed out of separator 26 at a temperature of approximately 80° F. to about 250° F. Off-gases 30 are then flowed into compressor 42. Compressor 42 compresses off-gases 30 to a pressure of approximately 300 psig to about 700 psig. This increase in pressure also elevates the temperature of off-gases 30 to approximately 237° F. to about 370° F. Off-gases 30 are flowed from compressor 42 into cooler 50 where they are cooled at approximately 70° F. to about 115° F. while being maintained at a pressure of approximately 300 psig to about 700 psig. The cooling medium used in cooler 50 is preferably water 54 although other coolants and methods of cooling off-gases 30 are acceptable. the partially cooled, high pressure off-gases 30 are then flowed from cooler 50 into heat exchanger 62.

As previously described, gaseous oxygen 22 is used as the oxidant for the wet oxidation reaction carried out in reaction apparatus 10. The oxygen source is preferably supplied on site as liquid oxygen 66. In one preferred method, liquid oxygen 66 is flowed into heat exchanger 62 in heat transfer relation with, but isolated from off-gases 30. In heat exchanger 62, liquid oxygen 66 is at a temperature of about $-217°$ C. to about $-183°$ C. Also, in heat exchanger 62, off-gases 30 are at a pressure of approximately 300 psig to about 700 psig and a temperature of approximately 0° F. to about 50° F. Heat is transferred from off-gases 30 to liquid oxygen 55 converting liquid oxygen 55 into gaseous oxygen 22 and converting off-gases 30 into liquid product 68. Thus, the present invention provides a method and apparatus for collecting and liquefying gases from a wet oxidation reaction and for converting liquid oxygen into its gaseous state. Not only is a valuable by-product produced in a marketable form by the present invention, significant energy savings are achieved.

Liquid product 68 is then flowed into tank 70 where any non-condensed gases 74 are removed. Some additional condensation of gases 74 may be achieved as the gases are vented from tank 70 by condenser valve 76. Liquid product 68 is then flowed from tank 70 to tanker trucks or the like for storage or transport.

Figure 2:
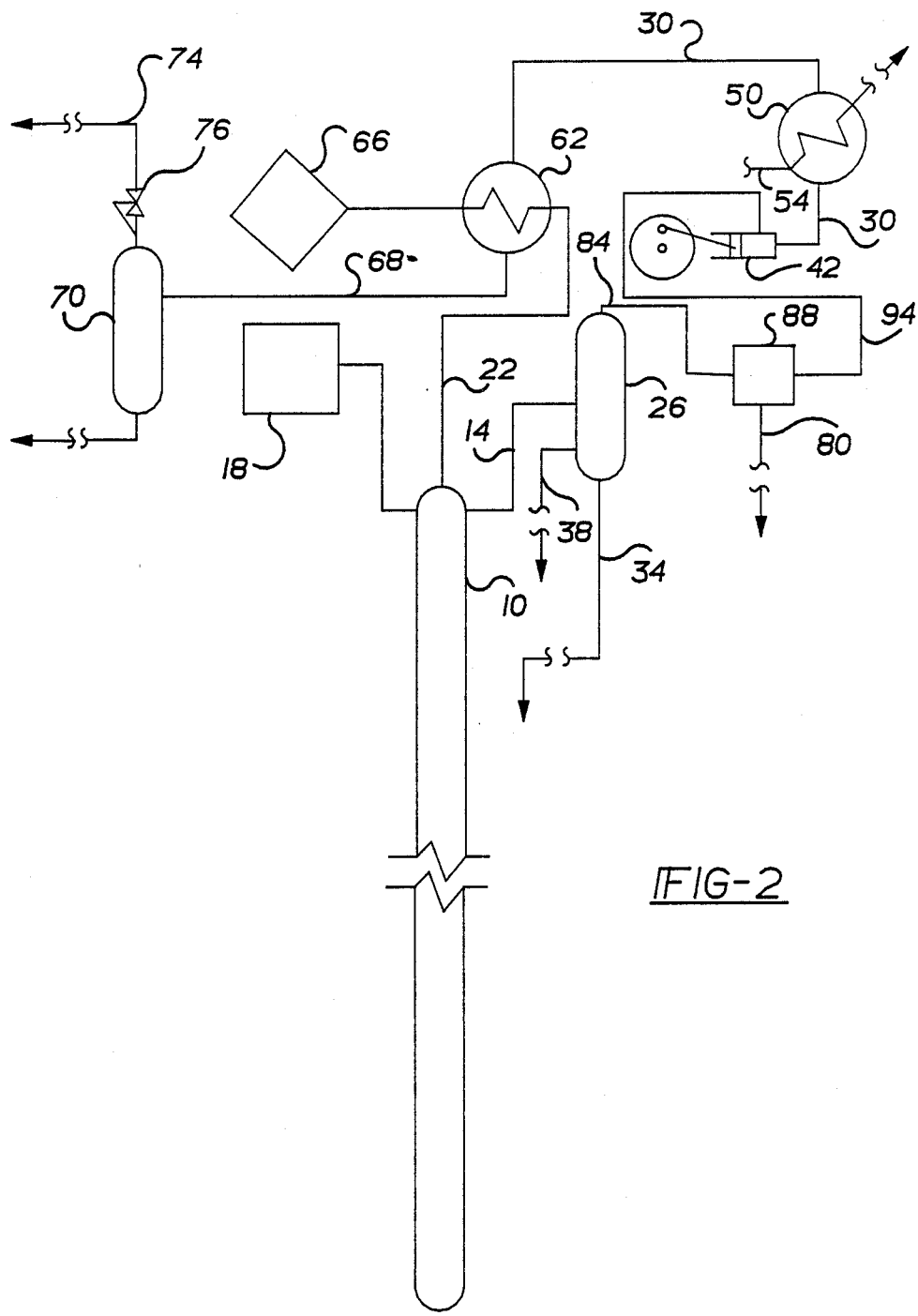
FIG. 2 of the drawings schematically depicts an alternate embodiment of the present invention wherein gaseous odor-producing compounds are extracted.

In still another aspect, and referring now to FIG. 2 of the drawings, odor-producing compounds 80 are removed from off-gases 84 using condenser 88. As will be appreciated, the chemical make-up of the off-gases separated from liquid effluent 14 will vary depending upon the extent of COD reduction and the chemical nature of influent waste 18. When the wet oxidation reaction is operated such that a high COD reduction is obtained, as is desirable the off-gases typically have a laundry-like odor produced by unsaturated hydrocarbon compounds. In order to reduce this odor, the present invention provides a method and apparatus for removing these odor-producing compounds from effluent off-gases. Not only is the undesirable odor reduced, the purity of the off-gases and thus of the final product is increased.

As illustrated in FIG. 2 of the drawings, and note that like elements are referenced with the corresponding reference numerals of FIG. 1, these odor producing unsaturated hydrocarbon compounds are removed from off-gases 84 through a condensation process. Hydrocarbon condensation is carried out in condenser 88 by condensing odor-producing compounds 80 without substantially condensing of the remaining off-gases. Off-gases 84 are flowed into condenser 88 at a pressure of approximately 100 psig to about 300 psig. Off-gases 84 are then cooled in condenser 88 to approximately 40° F. to about 80° F. Thus, odor producing unsaturated hydrocarbon compounds 80 are condensed without substantial condensation of other off-gases. Liquid product 94 is then flowed out of condenser 92. This step of removing odor producing compounds 80 by condensation is preferably performed, referring again to FIG. 1 of the drawings, as the off-gases leave separator 26 and before they reach compressor 42. It may be suitable however in some applications to perform this operation later in the sequence.

Figure 3:
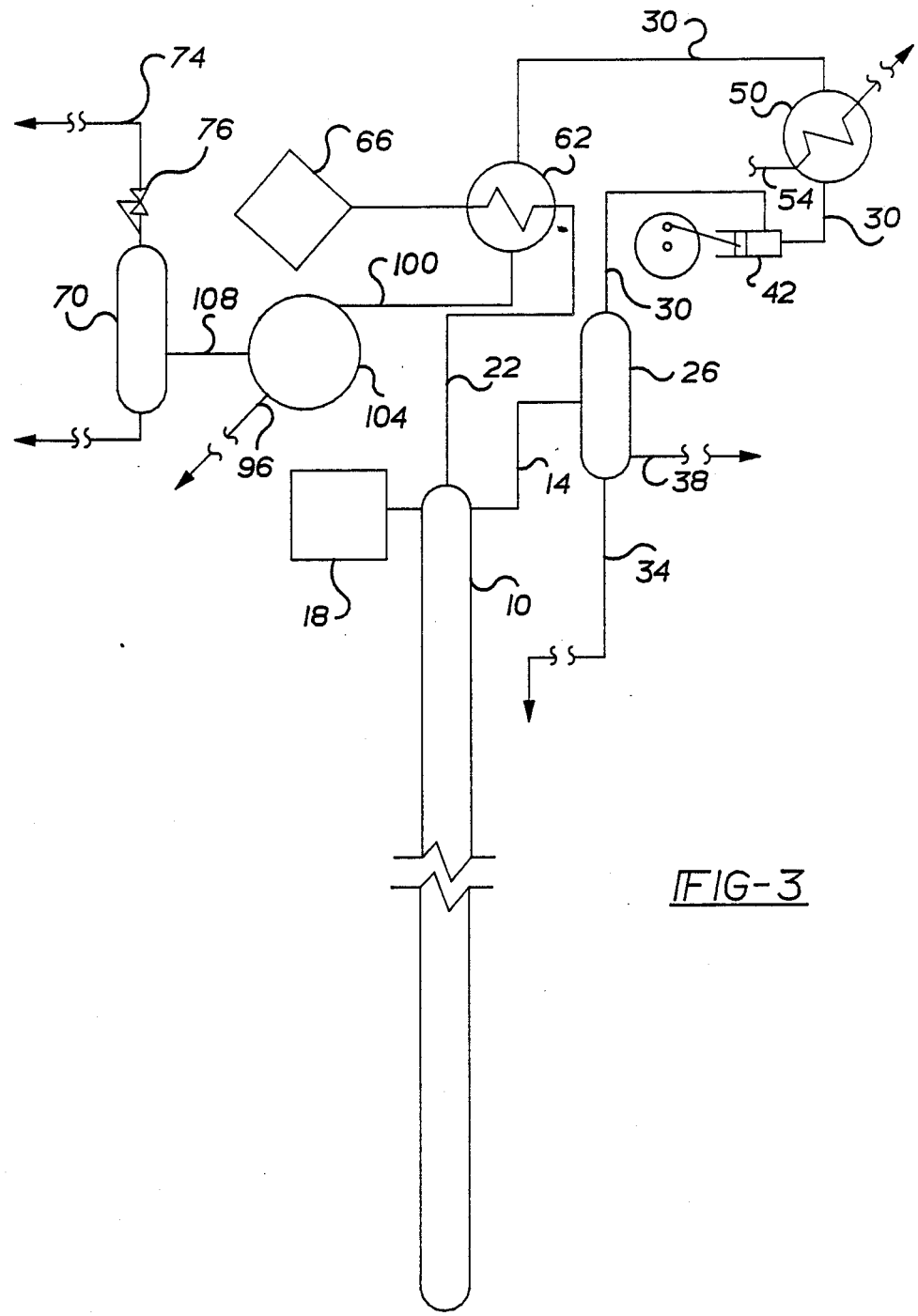
FIG. 3 of the drawings schematically depicts an alternate embodiment of the present invention in which liquid odorous substances are stripped.

Referring to FIG. 3 of the drawings, and again, like elements are numbered the same as in FIGS. 1 and 2, a method for substantially removing odor producing compounds 96 from the liquid off-gases 100 is provided. Liquidfied off-gas 100 is flowed from heat exchanger 62 into stripper 104 where odor producing compounds 96 are stripped out of liquid product 100. In this embodiment, the stripping must of course, take place after the off-gases which, again, principally contain $CO_2$, have been liquified in heat exchanger 62. Stripped, liquid product 108 is then flowed out of stripper 104, having a substantially reduced concentration of odor-producing compounds.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations which fall within the spirit and scope of the appended claims. For example, the cleaning of off-gases after separation and before liquefaction may be appropriate or desirable in some applications.

EXAMPLE

A continuous-flow, down-hole reaction apparatus is charged with 100 STPSD (short ton per stream day) COD (chemical oxygen demand) feed that comprises municipal waste diluted with water. The feed is oxidized by wet oxidation reaction wherein gaseous oxygen is injected into the feed at a ratio of 1600 lbs. $O_2$ per ton COD. The wet oxidation reaction produces 80% COD reduction. The effluent from the wet oxidation reaction apparatus includes a low-volume sterile ash, water (containing dissolved and suspended material) and off-gases. The principal constituent of the off-gases is $CO_2$. Based on the 80% COD reduction and the quantity of $O_2$ supplied to the feed, the reaction produces approximately 1600 lbs. of $CO_2$. The effluent is pumped to a pressurized separator where the pressure of the off-gases is approximately 150 psig at a temperature of about 90° F. The off-gases are then flowed to a $CO_2$ compressor (1 stage reciprocal, 75 ICFM $CO_2$). The compressor compresses the off-gases to 588 psig, whereupon the temperature of the off-gases is 320° F.

The hot, compressed off-gases are then flowed to a cooler. The cooler reduces the temperature of the compressed off-gases to 90° F. The gases remain at 588 psig. Water vapor in the off-gases is condensed and removed at 42 lbs/hr. The off-gases then flow into a heat exchanger. Liquid oxygen is also flowed into the heat exchanger at a rate of 6667 lb/hr., at a temperature of −189.9° F. and a pressure of 1500 psig. The liquid oxygen and the compressed hot gases coexist in the heat exchanger, but are separated from one another in heat-transfer relation. Heat is transferred from the off-gases to the liquid oxygen, gasifying the liquid oxygen. The temperature of the gaseous oxygen is 40° F. The gaseous oxygen then flows into the reaction apparatus where it mixes with the feed for wet oxidation. In the heat exchanger, the off-gases are converted into the liquid state. The liquid product is at 45° F. and 588 psig. The liquid product is flowed to a separator tank where non-condensed off-gases are separated from the liquid. Non-condensed off-gases may be returned to the reaction vessel for further processing, vented to atmosphere or incinerated. The liquid is principally liquid $CO_2$ and is pumped from the separator to tanker trucks at a rate of 7354 lbs/hr.

What is claimed is:

1. A method for the wet oxidation reaction of diluted organic waste in a down-hole reaction apparatus to recover effluent off-gases, said effluent off-gases principally containing carbon dioxide, the method comprising the steps of:
    (a) flowing said diluted organic waste downwardly into said down-hole reaction apparatus as a stream of influent waste;
    (b) injecting gaseous oxygen into said influent waste;
    (c) reacting said influent waste and said gaseous oxygen in said wet oxidation reaction to form reaction products, said reaction products including said effluent off-gases principally containing said carbon dioxide;
    (d) flowing said effluent off-gases into a heat-exchanger;
    (e) providing a supply of liquid oxygen;
    (f) flowing said liquid oxygen into said heat-exchanger such that the effluent off-gases and said liquid oxygen are in heat transfer relation with each other;
    (g) allowing a sufficient quantity of heat to flow from said effluent off-gases to said liquid oxygen such that said effluent off-gases are liquified to form a liquid product, said liquid product principally containing liquid carbon dioxide, and so that said liquid oxygen is gasified;
    (h) flowing said liquid product out of said heat exchanger;
    (i) flowing said gasified liquid oxygen out of said heat exchanger; and
    (j) using said gasified oxygen in said oxygen injecting step.

2. The method recited in claim 1 further including the step of increasing the pressure of said effluent off-gases before the step of flowing said effluent off-gases into said heat-exchanger.

3. The method recited in claim 2 wherein the temperature of said effluent off-gases is raised during said pressure increasing step such that the temperature of said effluent off-gases after said pressure increasing step is greater than the temperature of said effluent off-gases before said pressure increasing step.

4. The method recited in claim 3 further comprising the step of flowing said effluent off-gases through a cooler before said effluent off-gases are flowed into said heat-exchanger and cooling said effluent off-gases in said cooler to a temperature less than the temperature to which said effluent off-gases are allowed to rise during said pressure increasing step.

* * * * *